(12) United States Patent
Zhou

(10) Patent No.: US 10,944,275 B2
(45) Date of Patent: Mar. 9, 2021

(54) SMART CHARGING DEVICE

(71) Applicant: CHEN-SOURCE INC., Taoyuan (TW)

(72) Inventor: Bai-Lian Zhou, Taoyuan (TW)

(73) Assignee: Chen-Source Inc., Taoyuan (TW)

( * ) Notice: Subject to any disclaimer, the term of this patent is extended or adjusted under 35 U.S.C. 154(b) by 134 days.

(21) Appl. No.: 16/403,840

(22) Filed: May 6, 2019

(65) Prior Publication Data

US 2020/0358299 A1 Nov. 12, 2020

(51) Int. Cl.
*H02J 7/00* (2006.01)
(52) U.S. Cl.
CPC .................. *H02J 7/0026* (2013.01)
(58) Field of Classification Search
CPC .................................................... H02J 7/0026
USPC .......................................................... 320/107
See application file for complete search history.

(56) References Cited

U.S. PATENT DOCUMENTS

| 5,600,230 | A | * | 2/1997 | Dunstan | H02J 7/00036 |
| | | | | | 340/636.13 |
| 6,236,189 | B1 | * | 5/2001 | Franke | G01R 19/16542 |
| | | | | | 320/135 |
| 2012/0249075 | A1 | * | 10/2012 | Hori | H02H 7/18 |
| | | | | | 320/118 |
| 2013/0057201 | A1 | * | 3/2013 | Wakayama | H02J 7/0042 |
| | | | | | 320/107 |
| 2016/0336774 | A1 | * | 11/2016 | Onishi | H02J 50/12 |

* cited by examiner

*Primary Examiner* — Yalkew Fantu
(74) *Attorney, Agent, or Firm* — Muncy, Geissler, Olds & Lowe, P.C.

(57) ABSTRACT

A smart charging device includes a plurality of charging regions, and each charging region includes DC charging sockets disposed therein and configured to charge the mobile electronic devices. The smart charging device includes a to-be-charged device connection detection module, a power detection module, an abnormal detection processing module, a power overload processing module, a periodic alternating charging module, an abnormal charging processing module, a to-be-charged module, a remaining power charging module. These modules can process various conditions of the mobile electronic devices during charging process, so as to take turn to charge the external mobile electronic devices by allocating time to the charging regions, and implement power management mechanism.

4 Claims, 1 Drawing Sheet

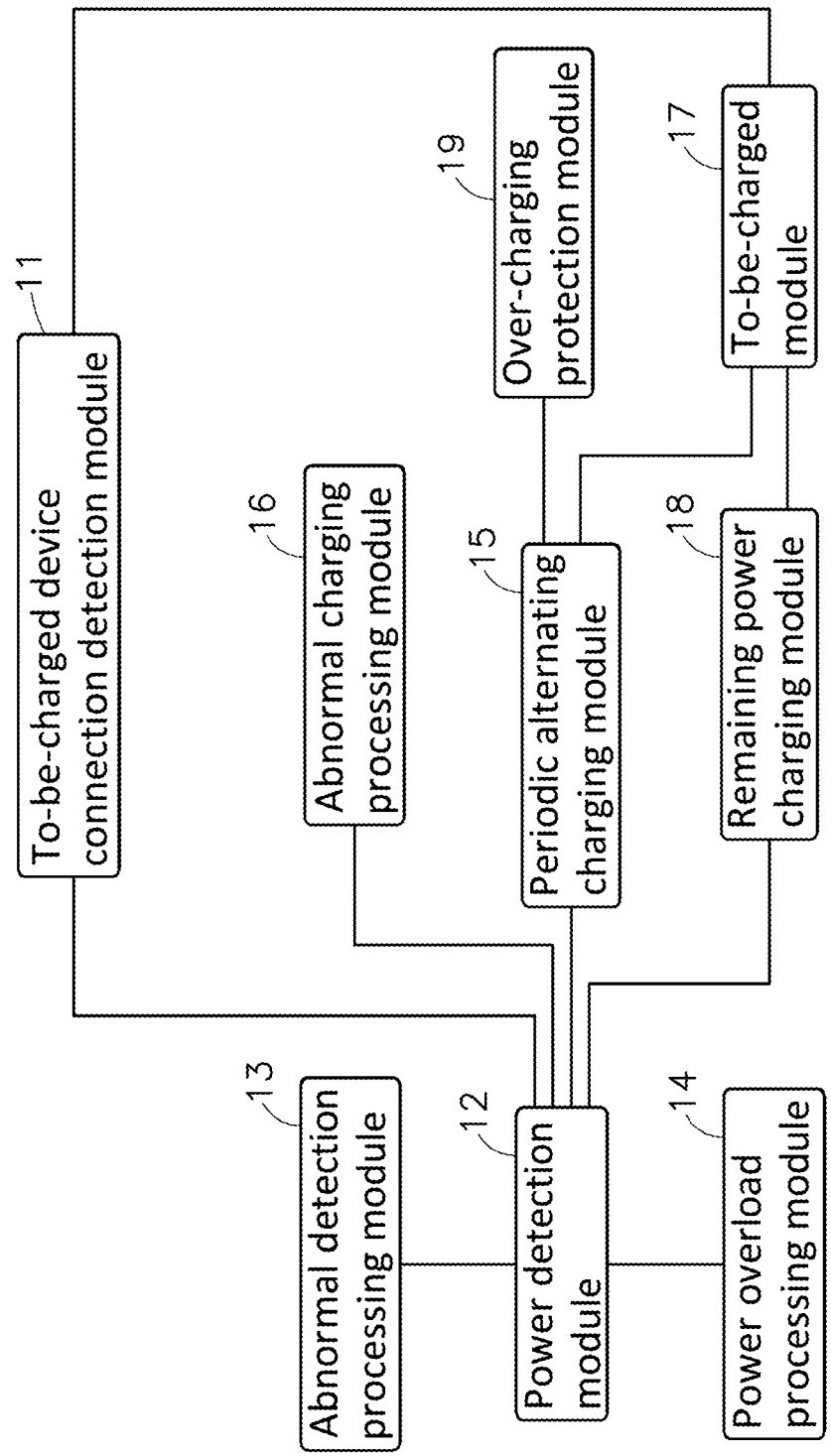

SMART CHARGING DEVICE

BACKGROUND OF THE INVENTION

1. Field of the Invention

The present invention relates to a smart charging device, more particularly to a smart charging device which is able to process various states of a plurality of mobile electronic devices during charging process, so as to charge the plurality of mobile electronic devices by allocating time and to implement the power management mechanism.

2. Description of the Related Art

In recent years, with rapid development of electronic technology and multimedia information, electronic products such as smart phones, tablet computers, and notebook computers are designed toward light, short, and powerful functions to have features of smaller size, lighter weight, and easy carry, and software and hardware of the electronic products are also continuously innovated, so that the electronic products can be used more flexibly and have improved practical effects, and become indispensable devices widely applied in people's work and life entertainment.

However, as the processing speed of the electronic product is improved, the mobile electronic device such as smart phone, tablet computer or notebook computer consumes more power. As a result, when a user operates a mobile electronic product while walking, the battery power of the mobile electronic device is quickly exhausted, and the user needs to find a power socket to charge the battery of the mobile electronic device.

In teaching environment (for example, schools), in order to meet the requirement in digital teaching, teachers and students use mobile electronic devices, such as tablets or notebooks, to replace traditional books for knowledge transfer, so how to conveniently charge the mobile electronics becomes extremely important. Generally, a charging device, such as a charging cabinet or a charging car, can provide a plurality of AC sockets (Alternating Current socket) or DC charging sockets (Direct Current charging sockets), such as USB sockets, disposed thereon to charge the mobile electronic devices through necessary chargers and charging lines. Since a power distribution system of the charging device is possibly overloaded when dozens of mobile electronic devices are charged on the charging device at the same time, the charging device is separated into multiple charging regions, and the mobile electronic devices electrically connected to the charging regions are repeatedly charged by turns, region by region, thereby preventing the power distribution system from overloading. However, when the charging regions are supplied with power by turns, region by region, the charging completion periods of the mobile electronic devices are undesirably delayed. Therefore, how to develop a fast and efficient smart charging device to solve above problems is a key issue in the industry.

SUMMARY OF THE INVENTION

Therefore, in order to solve the above-mentioned problems and defects, the inventors develop a smart charging device according to collected data, multiple tests and modifications, and years of research experience.

An objective of the present invention is to provide a smart charging device. Under a limited power supply of a power distribution system, the smart charging device can satisfy requirement in charging power which may be greater than the limited power supply, so as to charge the external mobile electronic devices by allocating time, and implement management mechanism for the power supply. The smart charging device of the present invention has two advantages, the first advantage is that total power required by the external mobile electronic devices can be allowed to exceed a maximal power supply of the smart charging device, and the second advantage is that the smart charging device can automatically detect the total power required by the mobile electronic devices, and detect whether the mobile electronic device is removed therefrom or electrically connected thereto.

Another objective of the present invention is to provide a smart charging device comprising a plurality of charging regions, each of the charging regions is provided with a plurality of DC charging sockets disposed therein and configured to charge a plurality of mobile electronic devices; the smart charging device also comprises a to-be-charged device connection detection module, a power detection module, an abnormal detection processing module, a power overload processing module, a periodic alternating charging module, an abnormal charging processing module, a to-be-charged module, and a remaining power charging module. These modules can be used to process various states of the mobile electronic devices during the charging process, so as to charge the plurality of external mobile electronic devices by allocating time to the charging regions, and implement power management mechanism.

Another objective of the present invention is that the smart charging device can comprise an over-charging protection module electrically connected to the periodic alternating charging module and configured to perform over-charging protection function when total power of the mobile electronic devices connected to the periodic alternating charging module exceeds a maximal power supply of the smart charging device during the charging process, and after the total power of the mobile electronic devices is lower than the maximal power supply of the smart charging device, the over-charging protection module enables the periodic alternating charging module to charge the mobile electronic devices.

BRIEF DESCRIPTION OF THE DRAWINGS

The structure, operating principle and effects of the present invention will be described in detail by way of various embodiments which are illustrated in the accompanying drawings.

The sole FIGURE is a functional block circuit diagram of a smart charging device of the present invention.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

Please refer to the sole FIGURE, which is a functional block diagram of a circuit of a smart charging device of the present invention. In an embodiment, the smart charging device can be a charging cabinet or a charging car, and can comprise a plurality of charging regions (not shown in the sole FIGURE). Each charging region can be provided with a plurality of DC charging sockets (not shown in the sole FIGURE) disposed therein and configured to charge a plurality of mobile electronic devices (not shown in the sole FIGURE). The smart charging device can comprise a to-be-charged device connection detection module 11, a power detection module 12, an abnormal detection processing module 13, a power overload processing module 14, a periodic alternating charging module 15, an abnormal charging processing module 16, a to-be-charged module 17, a remaining power charging module 18 and an over-charging protection module 19. The functions and connection relationships of these circuit modules are described in detail below.

The to-be-charged device connection detection module 11 is configured to detect whether the mobile electronic devices are electrically connected to the DC charging sockets, and obtain the number of the mobile electronic devices electrically connected to the DC charging sockets.

The power detection module 12 is electrically connected to the to-be-charged device connection detection module 11, and configured to calculate and detect, according to the number obtained by the to-be-charged device connection detection module 11, whether total power required by the mobile electronic devices exceeds a maximal power supply of the smart charging device. In an embodiment, the maximal power supply of the smart charging device is in a range of 300 W to 360 W.

The abnormal detection processing module 13 is electrically connected to the power detection module 12 and configured to process an abnormal condition detected and generated by the power detection module 12. In an embodiment, the abnormal condition can be a condition of current overload, voltage overload or temperature overload. The abnormal detection processing module 13 can transmit a processing result to the power detection module 12.

The power overload processing module 14 is electrically connected to the power detection module 12 and configured to process the condition that the total power required by the mobile electronic devices, calculated by the power detection module 12, exceeds the maximal power supply of the smart charging device, and transmit a processing result to the power detection module 12.

The periodic alternating charging module 15 is configured to separate the mobile electronic devices, which are electrically connected to the DC charging sockets, into a plurality of charging regions, and take turn to charge the mobile electronic devices for a predetermined period, region by region. In an embodiment, the predetermined period of the periodic alternating charging module 15 can be in the range of 10 to 30 minutes.

The abnormal charging processing module 16 is electrically connected to the periodic alternating charging module 15 and configured to process an abnormal condition detected and generated by the periodic alternating charging module 15. In an embodiment, the abnormal condition can be a condition of current overload, voltage overload or temperature overload. The abnormal charging processing module 16 can transmit a processing result to the power detection module 12.

The to-be-charged module 17 is electrically connected to the periodic alternating charging module 15 and the to-be-charged device connection detection module 11, the to-be-charged module 17 can mark each mobile electronic device, which is located in the separated regions and has been charged by turns, as a to-be-charged state or a removed state, and the to-be-charged module 17 can transmit a message marked as the removed state to the to-be-charged device connection detection module 11.

The remaining power charging module 18 is electrically connected to the power detection module 12 and the to-be-charged module 17, and configured to obtain a remaining power value which is calculated by subtracting the total power, required by the mobile electronic device, from the maximal power supply of the smart charging device detected by the power detection module 12. The mobile electronic device, marked as the to-be-charged state by the to-be-charged module 17, is charged according to the remaining power value.

The over-charging protection module 19 is electrically connected to the periodic alternating charging module 15 and configured to perform over-charging protection function on the periodic alternating charging module 15 when the total power required by the mobile electronic devices exceeds the maximal power supply of the smart charging device during the charging process, and after the total power required by the mobile electronic devices is lower than the maximal power supply of the smart charging device, the over-charging protection module 19 enables the periodic alternating charging module 15 to charge the mobile electronic devices.

As shown in the sole FIGURE, it can be understood that the smart charging device of the present invention can satisfy the requirement in charging power, which may be greater than the limited power supply of the power distribution system, and charge a plurality of external mobile electronic devices by allocating time to different charging regions, and can implement the management mechanism for power supply. The smart charging device of the present invention can have two advantages. The first advantage is that the total power required by the external mobile electronic devices is allowed to exceed the maximal power supply of the smart charging device, and the second advantage is that the smart charging device can automatically detect the power required by the mobile electronic devices and detect whether the mobile electronic device is removed from or electrically connected to the smart charging device. The smart charging device of the present invention can be applied to the charging cabinet or the charging car for charging the plurality of mobile electronic devices, and provide excellent charging performance with power management mechanism. Therefore, the smart charging device of the present invention has great commercial market opportunities.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A smart charging device, comprising a plurality of charging regions, wherein each of the charging regions is provided with a plurality of DC charging sockets disposed therein and configured to charge a plurality of mobile electronic devices, and the smart charging device comprises:
    a to-be-charged device connection detection module, configured to detect whether the mobile electronic devices are electrically connected to the plurality of DC charging sockets, and obtain the number of the mobile electronic devices electrically connected to the DC charging sockets;
    a power detection module electrically connected to the to-be-charged device connection detection module and configured to calculate and detect, according to the number obtained by the to-be-charged device connection detection module, whether total power required by the mobile electronic devices electrically connected to the plurality of DC charging sockets exceeds a maximal power supply of the smart charging device;
    an abnormal detection processing module electrically connected to the power detection module, and configured to process an abnormal condition detected by the power detection module, and transmit a processing result to the power detection module;
    a power overload processing module electrically connected to the power detection module, and configured to process the condition that the total power required by the mobile electronic devices, calculated by the power detection module, exceeds the maximal power supply of the smart charging device, and transmit a processing result to the power detection module;
    a periodic alternating charging module configured to separate the mobile electronic devices, which are electrically connected to the plurality of DC charging sockets, into the plurality of charging regions, and take turn to charge the mobile electronic devices for a predetermined period by allocating time to the charging regions;
    an abnormal charging processing module electrically connected to the periodic alternating charging module, and configured to process an abnormal condition detected by the periodic alternating charging module, and transmit a processing result to the power detection module; and
    a to-be-charged module electrically connect to the periodic alternating charging module and the to-be-charged device connection detection module, and configured to mark the mobile electronic device, which is located in one of separate regions and has been charged by turns, as a to-be-charged state or a removed state, wherein the to-be-charged module transmits a message marked as the removed state to the to-be-charged device connection detection module; and
    a remaining power charging module electrically connected to the power detection module and the to-be-charged module, and configured to obtain a remaining power value which is calculated by subtracting the total power required by the mobile electronic devices, from the maximal power supply of the smart charging device, detected by the power detection module, and charge the mobile electronic device marked as the to-be-charged state by the to-be-charged module, according to the remaining power value.

2. The smart charging device according to claim 1, further comprising an over-charging protection module electrically connected to the periodic alternating charging module, and configured to perform over-charging protection on the periodic alternating charging module when the total power required by the mobile electronic devices exceeds the maximal power supply of the smart charging device in the charging process, wherein after the total power required by the mobile electronic devices is lower than the maximal power supply of the smart charging device, the over-charging protection module enables the periodic alternating charging module to charge the mobile electronic devices.

3. The smart charging device according to claim 1, wherein the predetermined period of the periodic alternating charging module is in a range of 10 minutes to 30 minutes.

4. The smart charging device according to claim 1, wherein the maximal power supply of the smart charging device is in a range of 300 W to 360 W.

* * * * *